Dec. 28, 1965  D. L. BARRETT  3,225,812
AIRPLANE TIRE

Filed June 10, 1963  2 Sheets-Sheet 1

INVENTOR.
DONALD L. BARRETT
BY
J. B. Holden
ATTORNEY

United States Patent Office 3,225,812
Patented Dec. 28, 1965

3,225,812
AIRPLANE TIRE
Donald L. Barrett, Akron, Ohio, assignor to The Goodyear Tire & Rubber Company, Akron, Ohio, a corporation of Ohio
Filed June 10, 1963, Ser. No. 286,816
4 Claims. (Cl. 152—361)

The invention relates to an airplane tire and its manufacture. The tire is designed to be used on jets and other planes adapted to land at high speeds, such as 200 miles per hour, or more.

The centrifugal force generated by a tire operated at such speeds causes the tread diameter to expand, and chunks of the tread such as portions extending between two grooves in the tread surface may be thrown off from the tires now in use. The tire of this invention is built to limit such expansion, and to retain the tread intact.

It has previously been suggested that cord fabric be built into a tire to prevent such expansion of the tread diameter, and to prevent separation of portions of the tread. One difficulty with such constructions is that to prevent centrifugal separation of portions of the tread, the cords must be located near the tread surface. When the tread-design grooves are molded in the tread of such a tire, the bottoms of the grooves press the cords into the tire, and in the finished tire the cords are very near the bottoms of the grooves. When the tire is inflated, the grooves are spread. This tightens the cords and they tend to cut into the bottoms of the grooves. This tendency is enhanced in the area of the tread that is flattened whenever the plane lands. The grooves are then spread even more, and the cords tend to straighten out even more, and cut up into the bottoms of the grooves, producing groove cracking and fatigue cracking. On landing, the flattened spot or footprint travels rapidly around the entire circumference of the tire, causing rapid flexing as the grooves are widened and then retract. This not only intensifies the tendency to produce cracks in the bottoms of the grooves and peeling or chunking away of the rubber from the tread surface, but also the rapid flexing of the cords fatigues them at an accelerated pace, particularly where they are bent under the grooves, and they are short lived.

According to this invention, a ply of rubber containing short lengths of wire is usually incorporated in the tire adjacent the carcass. In a new tire it is usually located directly on the carcass. In a retreaded tire it is placed on the buffed surface which is very close to the carcass. Because the wires are not continuous but are short in length, this ply has more elongation than a ply of a continuous wire construction at this location. However, the elongation is not great. It permits only limited enlargement of the tire diameter due to centrifugal force. Because the wires are in short lengths the tire is very flexible, and withstands constant high-speed flexing admirably well.

A chief deterrent to diameter enlargement in the tire of this invention is the use of one or more plies of rubber in the tread in which there are short discontinuous filaments of nylon, polyester (e.g. Dacron and Vita Cord), rayon or the like aligned circumferentially of the tire. These filament lengths are concentrated in plies because this is much more effective in preventing diameter enlargement than if they were dispersed throughout the tread. Circumferential alignment of the filaments limits diameter enlargement better than a random arrangement.

By concentrating the filamentary material in plies it is kept away from the tread surface. Although the tread may eventually be worn to or through such a ply, initially the tread is composed entirely of rubber. This makes the best non-skid landing surface. Filaments or cords exposed at the tread surface dilute the efficiency of the rubber for landing purposes.

The short lengths of filament do not stiffen the tread as much as continuous cords. The tread is therefore more cut resistant, and in use generates less heat than a tread which contains continuous cords or wires or filaments.

The invention is further described in connection with the accompanying drawings, in which.

Figure 4:
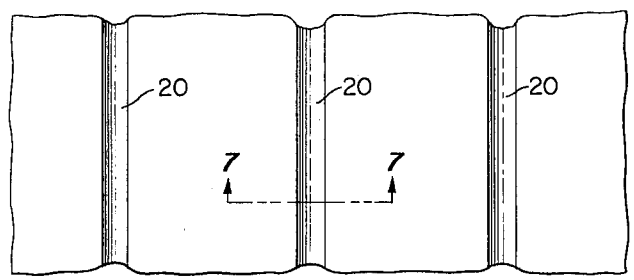
Figure 5:
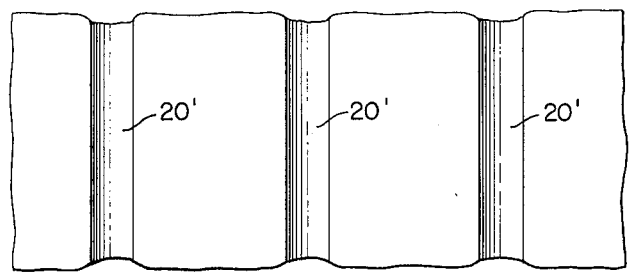
Figure 7:
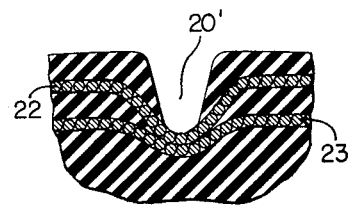
Figure 6:
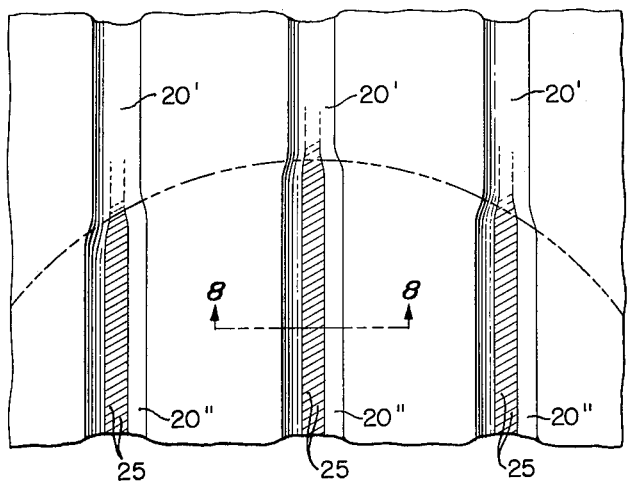

The tire of FIGURES 4 to 8 is a tire of the prior art for comparison. FIGURE 4 is a plan view of a tire with nylon cord plies in the grooved tread;

FIGURE 5 is a view of the same after inflation which causes the grooves to widen;

FIGURE 6 shows a portion of the same tread surface, with part of an elliptical or circular footprint of the tread flattened by contact with a runway;

FIGURE 7 is a section of this tire on the line 7—7 of FIGURE 4; and

Figure 8:
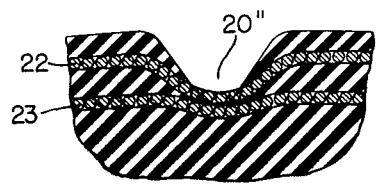

FIGURE 8 is a section on the line 8—8 of FIGURE 6.

Figure 1:
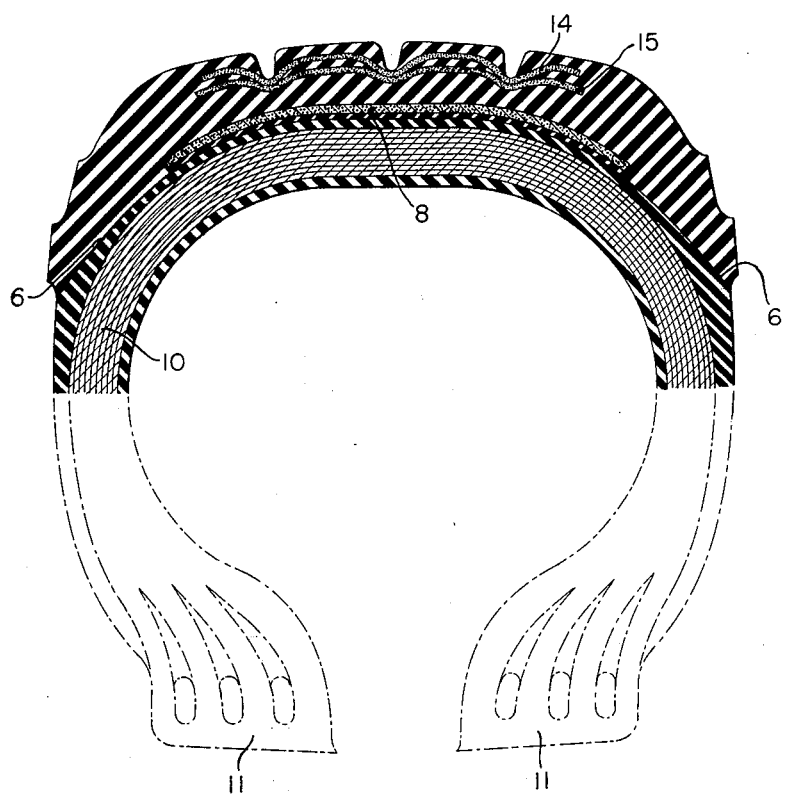
FIGURE 1 is a section through a retreaded tire of the improved construction set forth herein.

The tire 5 of FIGURE 1 is a retreaded tire in which the old tread has been removed to the buffed line 6. The ply 8 is a rubber ply containing short lengths of wire. These wire lengths are each about ⅜-inch to about ½ or ⅞-inch long. They are formed by shredding long wires, and are entirely distinct from one another, and generally are not orientated but are located at random in the tire. It is difficult to orientate them on a production basis. They might be orientated to some extent across the tire, from bead to bead. This ply may be 0.125 inch thick, or more generally 0.1 to 0.4 inch thick. In a new tire, such a ply is placed directly on the carcass, so that whether the tire is a new tire or a retreaded tire this ply which contains short discrete lengths of wire is located adjacent the carcass. The edges of the ply 8 are located within regions of the tire directly under the outside or shoulder grooves, extending somewhat beyond these grooves or falling short of the distance to them; the region in which their edges lie being relatively narrow compared to the tread width.

The carcass is of any usual airplane-tire construction with any desired number of carcass plies 10 bound around two or more beads in the respective bead portions 11 of the tire. Three beads on each side of the tire are shown, merely as illustrative of any suitable construction.

There may be one to four or possibly more reinforcing plies of shredded filaments of nylon or other synthetic oragnic fiber in the tread. The drawing shows two such plies 14 and 15 in which the short filament lengths are orientated generally circumferentially of the tire. Such orientation does not interfere with the grooves being spread, and therefore does not cause groove cracking. Each of the plies 14 and 15 may be about 0.04 inch thick. If a single ply is used it may be about 0.07 inch thick. Thus the one or more plies afford a reinforcement of discrete short lengths of filament in plies totaling about 0.06 to 0.1 inch thick. The outermost ply 14 is advantageously spaced a short distance, e.g. 0.03 or 0.07 or even 0.1 inch or more from the tread to provide a fabric-free surface on the new tire. The lengths of shredded filament will each be about ⅜ to about ⅞-inch long, or may be somewhat longer. They are individual and discrete filaments, each completely surrounded by rubber. Ordinarily there will be about 4 to 10 percent by weight of these short filaments in these reinforcing plies.

Figure 2:
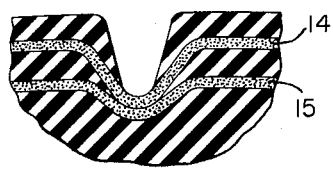
FIGURE 2 is a section through a groove of this tire when not under load.

FIGURE 1 illustrates a tire with two such plies 14 and 15 each measuring 0.04 or 0.06 inch thick composed of 5.4 percent of short nylon lengths and 94.6 percent of rubber, each nylon length measuring about ⅜ to ⅞ inch long. Each ply has a modulus at 10 percent elongation of about 500 p.s.i., or more generally 250 to 750 p.s.i. This provides the necessary stiffness in the tread to overcome the centrifugal forces which act on the tire tread at high speeds. The short lengths of nylon orientated circumferentially restrain enlargement of the tread diameter without cutting up into the bottoms of the grooves. FIGURE 2 shows the groove shape in the freshly cured tire. As the groove is spread on inflation of the tire, or when the tire tread surface is flattened when the plane lands, the grooves widen (FIGURE 3) without any tendency of the reinforcement in the plies 14 and 15 to cut up into the bottoms of the grooves. This is because: first, the short filaments are orientated cirumferentially of the tread so that they cannot cut *across* the grooves; and second, because the reinforcement is not continuous from one end of a ply to the other, it is expansible so that when the ply containing these short nylon filaments is placed under tension there is some slight relative movement between overlapping filaments, so that with respect to un-orientated nylon lengths within the ply (and there are usually a few) there is no tendency to cut into the bottoms of the grooves.

When a tire tread is reinforced with cord fabric, a very different situation prevails, as illustrated in FIGURES 4 to 8. FIGURES 4 and 7 show that the grooves 20 in the uninflated tire are relatively narrow. When the tire is inflated they widen, as shown at 20′ in FIGURE 5. The top portion of FIGURE 6 shows these widened grooves 20′, and in the footprint at the bottom, formed by contact of the tread with the runway at an airport, the grooves are shown widened to 20″. This latter is illustrated in section in FIGURE 8.

The surface is flattened most as the tire lands, probably as it makes it first contact or shock. The load should be light and gradually increase as wing lift decreases as the plane slows down. As the grooves are widened, the cords in the plies 22 and 23 biased at different angles to the center line of the tread, are tightened under the grooves and pull or lift one another out into the grooves. On sufficient repetition of this pulling or lifting action, the bottoms of the grooves become fatigue-cracked along lines 25 (FIGURE 6) parallel to the cords nearest the groove bottoms. There is not sufficient elongation in the continuous cords or cushioning of rubber around the tread-reinforcing cords to prevent the cords pulling or lifting into the bottoms of the grooves, breaking up into the grooves (FIGURE 8), and producing the characteristic groove cracking illustrated in FIGURE 6. Thus, reinforcing cords become exposed to moisture and abrasive action of fine dust and sand picked off of the runway, which weakens them. This weakening can cause complete loss of cord-ply reinforcing strength. It has been found that the abrasive wear rate of the tires of the prior-art construction is much greater, regardless of the composition of the reinforcing cord plies.

Figure 3:
FIGURE 3 is a view of the same when the tire is under load.

Various advantages of the new tire structure are set forth above, but there are other advantages. By elongation of the reinforcement, as illustrated in FIGURE 3, the heat generated is less than in a prior-art tire. The running temperature of the tires of this invention has been found to be about 5° C. less than that of the airplane tires now used commercially, when tested under similar circumstances. The reduction in running temperature is partially due to the fact that there is less flexing of the reinforcement. Also, elimination of air voids in the twist of cords previously employed reduces heat-insulation. This lower running temperature reduces fatigue, and the tire has longer life, due partially to the fact that there are no long continuous reinforcing elements to snap when fatigued, coupled with the fact that the structural elements are less apt to be subjected to fatiguing.

The short lengths of filaments are more easily elongated than continuous filaments, making the surface of the tire softer and more subject to deflection. As a consequence, the treads of the tires of this invention are freer from cuts and bruises.

The filament lengths are not dispersed through the tire tread, but are concentrated in piles. As a consequence the tread surface of a tire, when new, is composed entirely of rubber. Rubber makes the best known landing surface, being abrasive and heat resistant. It is an advantage of this tire construction that the tread is more nearly duplicated on all tread surfaces regardless of the composition of the reinforcement employed.

As landing speeds increase, the number of nylon plies in the improved tire of this invention must be increased to counteract the greater centrifugal forces encountered.

These various factors each contribute to the proven fact, that the number of landings made with tires of this invention, before replacement, is greater than that of tires of the prior art by as many as sixteen or more.

The invention is covered in the claims which follow.

What I claim is:

1. A toroidal tire with beads and a carcass, for use on airplanes or the like, with two circumferential grooves in its tread surface, and a narrow band composed entirely of vulcanized rubber compound forming the tread surface between the grooves with each end of the band forming the outer portion of a wall of each groove, and contacting the inner surface of this band a concentration of short lengths of synthetic organic filaments each individually surrounded by vulcanized rubber compound, the band becoming thicker as it approaches each groove whereby said concentration of short filament lengths dips downward under the bottom of each groove and is adjacent the bottom thereof.

2. The tire of claim 1 in which the tire is retreaded, the concentration of the filaments is in the retread and the filaments are generally orientated circumferentially of the tire.

3. The tire of claim 1 in which the filaments are composed essentially of nylon composition.

4. The tire of claim 1 in which the filaments are composed essentially of polyester.

References Cited by the Examiner
UNITED STATES PATENTS

| | | | |
|---|---|---|---|
| 2,207,100 | 7/1940 | Maynard | 156—128 |
| 2,513,064 | 6/1950 | Solomon et al. | 152—211 |
| 2,557,945 | 6/1951 | Crooker | 152—211 |
| 2,710,042 | 6/1955 | Gates | 152—211 X |
| 2,943,663 | 7/1960 | Antonson | 152—361 X |
| 2,960,139 | 11/1960 | Engstrom et al. | 152—361 X |
| 3,052,274 | 9/1962 | Lang | 152—354 |
| 3,057,389 | 10/1962 | Dubetz et al. | 152—210 |
| 3,062,696 | 11/1962 | Riehl | 156—128 |

ARTHUR L. LA POINT, *Primary Examiner.*